United States Patent
Hyser et al.

(10) Patent No.: US 8,332,847 B1
(45) Date of Patent: Dec. 11, 2012

(54) VALIDATING MANUAL VIRTUAL MACHINE MIGRATION

(75) Inventors: Chris D. Hyser, Victor, NY (US); Brian J. Watson, Chesapeake, VA (US); Bret A. McKee, Fort Collins, CO (US); Robert D. Gardner, Fort Collins, CO (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 968 days.

(21) Appl. No.: 12/236,271

(22) Filed: Sep. 23, 2008

Related U.S. Application Data

(60) Provisional application No. 61/010,687, filed on Jan. 10, 2008.

(51) Int. Cl.
*G06F 9/455* (2006.01)

(52) U.S. Cl. .......................................................... 718/1

(58) Field of Classification Search .................. 718/1
See application file for complete search history.

(56) References Cited

U.S. PATENT DOCUMENTS

| | | | |
|---|---|---|---|
| 5,479,599 A | 12/1995 | Rockwell | |
| 5,555,370 A | 9/1996 | Li | |
| 5,668,995 A | 9/1997 | Bhat | |
| 5,946,469 A | 8/1999 | Chidester | |
| 6,081,864 A | 6/2000 | Lowe | |
| 6,370,560 B1 | 4/2002 | Robertazzi | |
| 6,393,557 B1 | 5/2002 | Guthridge | |
| 6,543,047 B1 | 4/2003 | Vrhel, Jr. | |
| 6,560,606 B1 | 5/2003 | Young | |
| 6,564,112 B1 | 5/2003 | Factor | |
| 6,667,992 B1 | 12/2003 | Yanagawa | |
| 7,082,521 B1 | 7/2006 | Nanja | |
| 7,197,534 B2 | 3/2007 | Donoho | |
| 7,203,944 B1 * | 4/2007 | van Rietschote et al. | 718/104 |
| 7,257,811 B2 * | 8/2007 | Hunt et al. | 718/1 |
| 7,607,129 B2 * | 10/2009 | Rosu et al. | 718/1 |
| 7,673,113 B2 * | 3/2010 | Sugumar et al. | 711/170 |
| 7,716,667 B2 * | 5/2010 | van Rietschote et al. | 718/1 |
| 7,849,286 B2 * | 12/2010 | Sugumar et al. | 711/173 |
| 7,984,449 B2 * | 7/2011 | Baran et al. | 719/313 |
| 2003/0023435 A1 | 1/2003 | Josephson | |
| 2004/0230970 A1 | 11/2004 | Janzen | |
| 2004/0244000 A1 | 12/2004 | Frank et al. | |
| 2005/0251802 A1 * | 11/2005 | Bozek et al. | 718/1 |
| 2005/0262091 A1 | 11/2005 | Marvin et al. | |
| 2005/0268298 A1 | 12/2005 | Hunt | |
| 2007/0006205 A1 | 1/2007 | Kennedy et al. | |
| 2007/0043860 A1 | 2/2007 | Pabari | |
| 2007/0169121 A1 | 7/2007 | Hunt | |
| 2007/0180436 A1 | 8/2007 | Travostino et al. | |

(Continued)

OTHER PUBLICATIONS

U.S. Appl. No. 12/237,177, Non-Final Rejection dated Sep. 16, 2011, pp. 1-12 and attachments.

*Primary Examiner* — Aimee Li

(57) ABSTRACT

To validate manual virtual machine migration, a placement controller receives a user request to manually migrate at least one virtual machine across physical machines. Based on criteria used by the placement controller for automatically selecting placement of virtual machines on the physical machines, it is determined whether the user-requested migration of the at least one virtual machine violates the criteria. In response to determining that the user-requested migration violates the criteria, a notification of the violation is provided.

21 Claims, 3 Drawing Sheets

U.S. PATENT DOCUMENTS

| | | |
|---|---|---|
| 2007/0204266 A1* | 8/2007 | Beaty et al. .................... 718/1 |
| 2008/0059556 A1* | 3/2008 | Greenspan et al. ........... 709/201 |
| 2008/0104587 A1* | 5/2008 | Magenheimer et al. .......... 718/1 |
| 2008/0104608 A1* | 5/2008 | Hyser et al. .................. 718/105 |
| 2008/0127182 A1 | 5/2008 | Newport |
| 2008/0163207 A1* | 7/2008 | Reumann et al. ................ 718/1 |
| 2009/0051492 A1 | 2/2009 | Diaz |
| 2009/0113422 A1 | 4/2009 | Kani |

* cited by examiner

VALIDATING MANUAL VIRTUAL MACHINE MIGRATION

CROSS REFERENCE TO RELATED APPLICATIONS

This Application claims the benefit of U.S. Provisional Application Ser. No. 61/010,687, filed Jan. 10, 2008, titled "Validating Manual Virtual Machine Migration"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer For enhanced performance, virtual machines can be provided on multiple computers that are interconnected by a network. In some implementations, an automated placement controller can be provided to determine computers that the virtual machine is to be deployed on. Based on predetermined criteria, the placement controller is able to migrate at least some of the virtual machines across different computers.

In some cases, a user may wish to manually request migration of one or more virtual machines across different computers. However, the user's requested action may be inconsistent with criteria considered by the placement controller in selecting computers on which the virtual machines are to be deployed. In such a scenario, the placement controller may simply undo the user's requested action, which may frustrate the user's goal or intention.

BRIEF DESCRIPTION OF THE DRAWINGS

Some embodiments of the invention are described with respect to the following figures.

DETAILED DESCRIPTION

Figure 1:
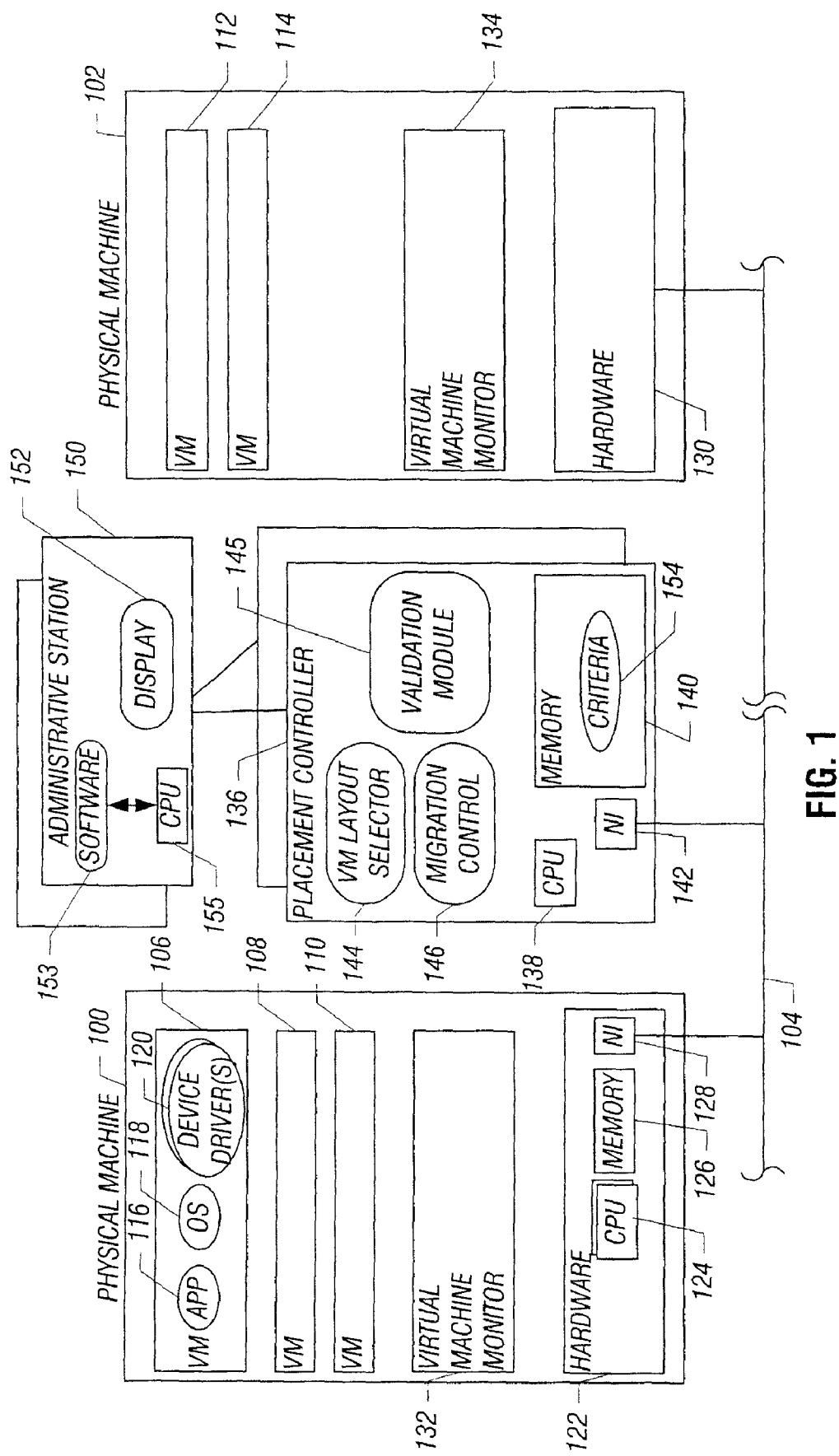
FIG. 1 is a block diagram of a system of physical machines on which virtual machines are deployed, where the system further includes a placement controller to perform automated selection of virtual machine layouts, and an administrative station to allow for a user to request a manual selection of a virtual machine layout, in accordance with some embodiments.

In accordance with some embodiments, a technique or mechanism is provided to allow an automated placement controller to validate manual live virtual machine placement by a user. A user request can be received by the placement controller for manually migrating at least one virtual machine across physical machines. "Live migration" refers to migration of the virtual machine while the physical machines are operational. A user request to manually migrate a virtual machine refers to a user request that specifies that the virtual machine is to be migrated from one physical machine to another physical machine, according to a manual decision made by a user, and not based on selection made by the automated placement controller. In one example, a user request to manually migrate a virtual machine across physical machines can be in the form of a layout of virtual machines selected by the user. Alternatively, the user request to manually migrate a virtual machine can simply be a request that identifies the virtual machine to be migrated and that identifies the source physical machine and the destination physical machine.

The automated placement controller is able to automatically select one or more layouts of virtual machines according to various criteria. A "layout" of virtual machines refers to placement of virtual machines on physical machines. Based on the criteria used by the placement controller for selecting placement of virtual machines on physical machines, the placement controller determines whether the user-requested migration of the at least one virtual machine violates the criteria. The user-requested migration "violates" the criteria if the user-requested migration is not in optimal agreement with the criteria, or the user-requested migration will potentially cause disagreement with the criteria. In response to determining that the user-requested migration violates the criteria, a notification is provided of the violation. A violation of the placement selection criteria can be an indication that the user is unaware of or does not understand the criteria (which can be complex), or that the placement controller is operating with an incorrect set of criteria or that some criteria may have unintended interactions with other criteria.

In some large systems, there may be many administrators that may have set many criteria to be considered by the placement controller. Such criteria may be stored in a database. Consequently, the placement controller will usually have a better memory or understanding of the criteria than any individual administrator, so that the placement controller can validate user-requested manual migrations.

Examples of physical machines include computers (e.g., application servers, storage servers, web servers, etc.), communications modules (e.g., switches, routers, etc.), and other types of machines. "Physical machine" indicates that the machine is an actual machine made up of software and hardware. A virtual machine refers to some partition or segment (made up of software and/or hardware) of the physical machine that is provided to virtualize or emulate a physical machine. From the perspective of a user, a virtual machine looks just like a physical machine.

FIG. 1 illustrates a system that includes multiple physical machines 100, 102 that are interconnected by a network 104. Examples of the network 104 include a local area network (LAN), a wide area network (WAN), the Internet, or any other type of communications link. The physical machines can be located within one cabinet (or rack), or alternatively, the physical machines can be located in multiple cabinets (or racks). The network 104 can also include system buses or other fast interconnects. The system depicted in FIG. 1 can be any one of an application server farm, a storage server farm (or storage area network), a web server farm, a switch or router farm, other type of data center, and so forth. Although just two physical machines are depicted in FIG. 1, it is noted that more than two physical machines can be utilized in other implementations.

Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, three virtual machines 106, 108, and 110 are depicted in the physical machine 100, and two virtual machines 112, 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

As depicted in FIG. 1, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine 100, these physical resources are part of the hardware 122, which includes one or more central processing units (CPUs) 124, memory (volatile memory and/or persistent storage, such as disk-based storage) 126, a network interface 128, and other resources (such as a storage area network interface, not shown). Hardware 130 in the physical machine 102 contains similar components.

The physical machine 100 also includes a virtual machine monitor (VMM) 132, also called a hypervisor, which manages the sharing (by virtual machines 106, 108, 110) of the physical resources, including the hardware 122, of the physical machine 100. The VMM 132 virtualizes the physical resources, including the hardware 122, of the physical machine 100. Also, the VMM 132 intercepts requests for resources from operating systems in the respective virtual machines 106, 108, 110 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 122 of the physical machine 100. The interface provided by the VMM 132 to an operating system of a virtual machine is designed to emulate the interface provided by the actual hardware of the physical machine 100.

The physical machine 102 similarly includes a VMM 134 that provides the interface between the virtual machines 112, 114 and the physical resources, including hardware 130, of the physical machine 102.

In accordance with some embodiments, one or more placement controllers 136 are provided on the network 104 to provide automated management of the placement of virtual machines in corresponding physical machines 100, 102 (and any other physical machines in the system depicted in FIG. 1). In the ensuing discussion, reference is made to just one placement controller 136; however, note that the tasks of the one placement controller 136 can be performed by multiple placement controllers.

The placement controller 136 is able to determine an efficient placement of the virtual machines on corresponding physical machines based on predefined criteria (according to a target policy set by an enterprise, a user, an administrator, etc.). The predefined criteria according to the policy can include a target quality-of-service level to be provided, loading criteria (which specify some target loading level on a physical resource or machine), balancing criteria (which specify that load on physical machines should be balanced when possible), cooling criteria (which specify temperatures in physical machines that should not be exceeded), power criteria (which specify that power consumption should be reduced where possible), cost of migrating virtual machines, criteria indicating which virtual machines should be run on a common physical machine, criteria indicating which virtual machines should be run on different physical machines, criteria specifying a limit on frequency of virtual machine migration, and other criteria.

The placement controller 136 is able to determine whether the current state of the overall system (which includes the multiple physical machines) conforms to the policy. If the placement controller 136 determines that the state of the system does not conform to the policy, then the placement controller 136 can perform a re-evaluation to determine a different placement of virtual machines on physical machines to increase conformance to the policy.

If a different placement is determined by the placement controller 136 to be desirable, the placement controller 136 is able to select new layouts of virtual machines, where a new layout involves the virtual machines being deployed in a group of physical machines that is different from a prior layout of the virtual machines on a different group of physical machines. According to the new layout, the placement controller 136 is able to perform migration of virtual machines from one physical machine to another physical machine. After placement of the virtual machines has been changed (by migration), the placement controller 136 can subsequently determine whether further migration should be performed. Note that workloads or other conditions at the physical machines are continually changing. The placement controller 136 repeatedly checks (in a loop) whether the state of the system conforms to policy (or alternatively, the placement controller 136 can be triggered asynchronously to perform the check). In effect, the placement controller 136 provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

In accordance with some embodiments of the invention, in addition to automated layout selection by the placement controller 136, a user can use an administrative station 150 (or other user station) to request a manual migration of virtual machines across physical machines. The administrative station 150 (or other user station) can be implemented with a computer. The user, through input devices of the administrative station 150, can identify at least one virtual machine that is to be migrated, at least one source physical machine from which the at least one virtual machine is to be migrated from, and at least one destination physical machine to which the at least one virtual machine is to be migrated to. The selection of the at least one virtual machine to migrate can be made within a user interface, such as a graphical user interface (GUI), that is presented in a display device 152 of the administrative station 150. For example, the GUI can be a wizard that provides one or more screens to enable user interactivity.

As depicted in FIG. 1, the administrative station 150 also includes software 153 that is executable on one or more CPUs 155. The software 153 is able to receive requests submitted through a user interface displayed in the display 152 of the administrative station 150, and to process such requests accordingly. For example, the software 153 can receive a user request to perform manual migration of at least one virtual machine, and in response, can submit this user request to the placement controller 136. The software 153 is also able to receive notification of violations as well as explanations of such violations from the placement controller 136 so that the notifications and explanations can be presented in the user interface of the display device 152.

Alternatively, the user request for migrating virtual machines can be in the form of a proposed layout (made by the user) of virtual machines across physical machines, with the layout communicated to the placement controller 136 to allow the placement controller 136 to determine which virtual machines should be migrated according to the user-requested manual layout.

Note that multiple administrative stations 150 can be provided to allow for multiple corresponding users to request manual migrations of virtual machines.

As further depicted in FIG. 1, each placement controller 136 includes one or more CPUs 138 and memory 140. Also, a network interface 142 is provided in the placement controller 136 to allow communication between the placement controller 136 and the network 104.

The placement controller 136 also includes a VM layout selector 144 (to perform selection of a layout of the virtual machines mapped to physical machines) according to criteria 154 stored in the memory 140, in accordance with some embodiments. Additionally, the placement controller 136 includes a migration control module 146 to control migration of virtual machines from one physical machine to another physical machine (in accordance with the layout selected by the VM layout selector 144).

Also, the placement controller 136 includes a validation module 145 for validating user-requested manual migrations of virtual machines, as received from the administrative station(s) 150. Based on the validation performed by the validation module 145, a notification can be provided back to the administrative station 150 of whether the requested user migration is valid or invalid. The placement controller 136 can also provide an explanation regarding why the requested manual migration of virtual machine(s) is invalid. Based on the notification, the user at the administrative station 150 can either withdraw the request for manual virtual machine migration or alternatively, the user at the administrative station 150 can insist that the manual virtual machine migration should proceed.

If the requested manual virtual machine migration violates one or more criteria that the placement controller 136 considers in selecting layouts of virtual machines, the notification provided from the placement controller 136 to the administrative station 150 can contain an explanation that identifies the one or more criteria that the user-requested manual virtual machine migration violates. Using the validation technique allows a user to use the placement controller 136 to perform checking and validation of manually requested migrations. As a result, the user does not have to manually validate a possibly long and complicated chain of criteria that are to be considered in performing migrations.

If the user at the administrative station 150 desires that the manual virtual machine migration proceed despite the noted violation of the existing criteria, the user at the administrative station 150 can modify the criteria, and communicate that modification to the placement controller 136. Modifying the criteria can include any one or more of the following: (1) adding one or more new criteria, (2) changing one or more existing criteria, and (3) deleting one or more existing criteria. In this manner, errant criteria and/or unanticipated interactions between criteria can be identified and corrected.

Alternatively, instead of the user communicating modified criteria to the placement controller 136, the placement controller 136 can automatically determine criteria to modify in response to user's confirmation that the manual virtual machine migration should proceed despite violation of existing criteria.

The criteria 154 considered by the VM layout selector 144 in selecting placements of virtual machines on physical machines can be of various types. One type of criteria is related to loading of physical resources (including hardware 122) or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources. Each of the resources is associated with a respective dimension.

Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

Other example types of criteria that are considered by the VM layout selector 144 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 144. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that is considered by the VM layout selector 144 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 144 determines that the benefit of migrating a virtual machine is less than the cost of performing the migration, then the migration should not be performed.

As mentioned above, further criteria considered by the placement controller 136 include criteria indicating which virtual machines should be run on a common physical machine, criteria indicating which virtual machines should be run on different physical machines, and criteria specifying a limit on the frequency of virtual machine migration (in other words, a limit on how often virtual machines should be migrated within some predefined time interval).

Figure 2:
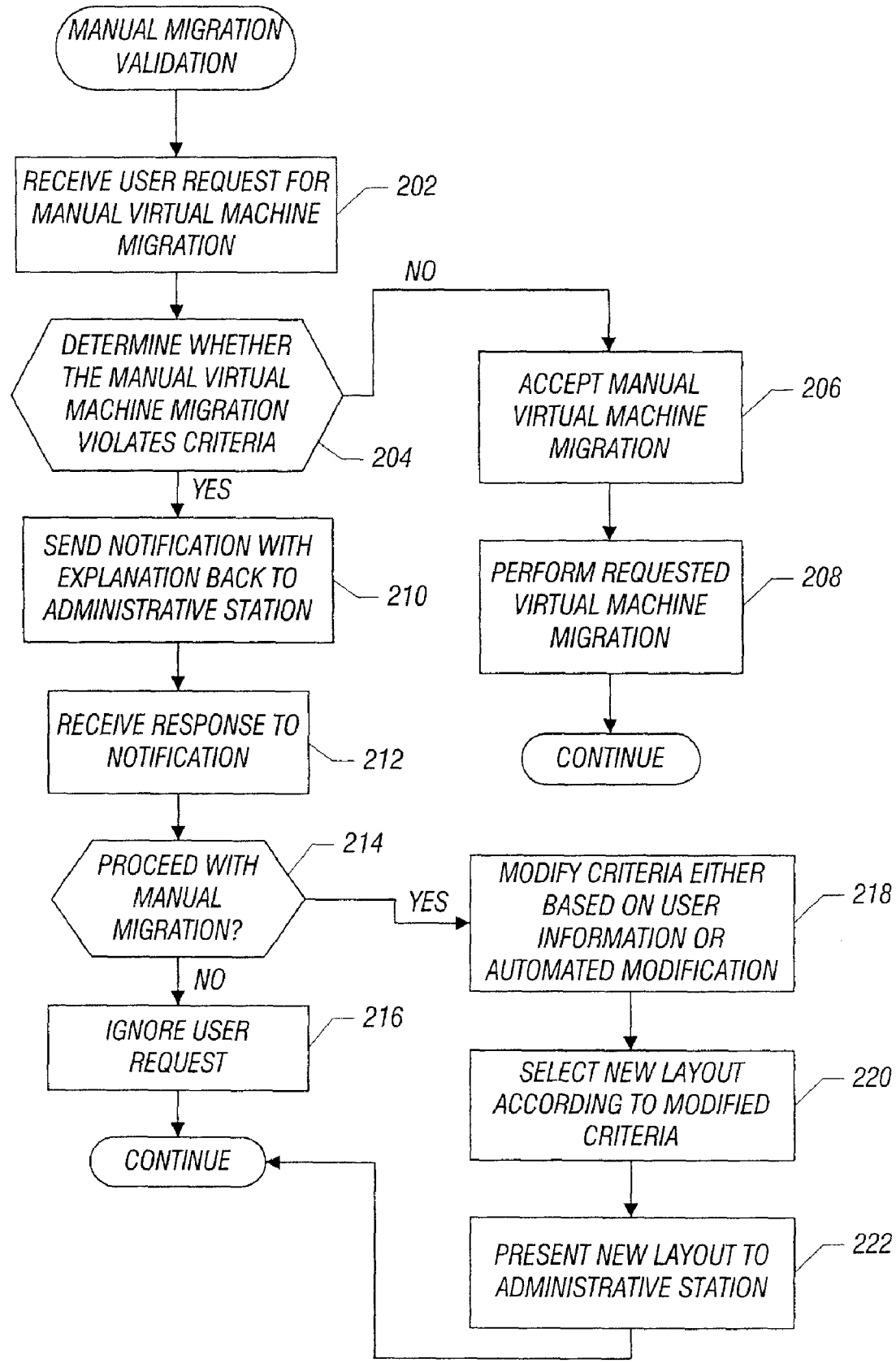
FIG. 2 is a flow diagram of a process of validating a user-requested action with respect to placement of virtual machines, in accordance with an embodiment.

FIG. 2 shows a flow diagram of a process of validating a user-requested manual migration of one or more virtual machines. The process of FIG. 2 can be performed by the validation module 145 of FIG. 1 in the placement controller 136.

A user request for manual virtual machine migration is received (at 202). It is then determined (at 204) whether the manual virtual machine migration violates criteria considered by the placement controller 136 in selecting layouts of virtual machines. If not, the manual virtual machine migration is accepted (at 206), and the placement controller 136 performs (at 208) the requested virtual machine migration. This involves the placement controller 136 sending one or more commands to the physical machines that are involved, and causing the affected virtual machine(s) to migrate across physical machines.

On the other hand, if the placement controller 136 determines (at 204) that the requested manual virtual machine migration violates the criteria, the placement controller 136 sends (at 210) notification of the violation to the administrative station 150, where the notification can contain an explanation regarding the violation. As noted above, the explanation can identify one or more criteria that the requested manual virtual machine migration violates. This may enable the user to better understand the criteria that are considered by the placement controller 136.

The placement controller 136 then waits to receive (at 212) a response to the notification. The placement controller 136 determines (at 214) whether the response indicates that the manual virtual machine migration should proceed anyway even though existing criteria are violated. If the response indicates that the manual virtual machine migration is not to proceed, then the placement controller 136 can ignore (at 216) the initially received user request (at 202). For example, at the administrative station 150, a dialog can be presented in a user interface to allow the user to abort the user-requested manual virtual machine migration.

On the other hand, if the response received at 212 indicates that the placement controller 136 is to proceed with the manual migration despite the violation, then the existing criteria considered by the placement controller 136 in selecting layouts of virtual machines is modified (at 218), where the modification can be based on user information (e.g., the user can indicate which criteria to modify), or alternatively, based on automated modification performed by the placement controller. To allow for user modification of criteria, the user interface presented in the display device 152 of the administrative station 150 can present another dialog to allow the user to modify criteria considered by the placement controller 136 in selecting layouts of virtual machines.

According to the modified criteria, the placement controller 136 selects (at 220) a new layout. The new layout can then be presented (at 222) to the administrative station to allow the user to confirm whether the new proposed layout coincides with the user's goal.

Note that the modified criteria, instead of or in addition to the new layout, can be communicated to the administrative station for consideration by the user. The user can then confirm whether or not the modified criteria is to be used by the placement controller 136 in selecting layouts of virtual machines.

Alternatively, instead of performing the above tasks in response to a user request for manual virtual machine migration, note that the manual virtual machine migration may have already occurred (e.g., migration forced by the user). In this case, the validation module 145 will detect the manual migration, and will determine whether the manual migration violates criteria. If so, the user may be notified and prompted with one of various options: (1) allow the manual migration to remain and change the criteria; or (2) revert the system to an original configuration prior to the manual migration.

The tasks of FIG. 2 may be provided in the context of information technology (IT) services offered by one organization to another organization. For example, the infrastructure (including the placement controllers, physical machines, and virtual machines of FIG. 1) may be owned by a first organization, while the administrative stations 150 of FIG. 1 may be located at a second organization. The IT services may be offered as part of an IT services contract, for example.

In accordance with an embodiment, a simulated annealing technique is used by the VM layout selector 144 to find an approximation of an optimal placement of virtual machines on physical machines. Note that other techniques can be used in other implementations. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 144 is based on a cost function (alternatively referred to as a "goodness function") that takes into account various constraints that represent the predefined criteria described above. The cost function is represented by some aggregation of terms, where each term is multiplied by a weight factor. Generally, the cost function has the form: $f=w_1 \times t_1+w_2 \times t_2+\ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, and so forth. The weight to be multiplied to each term generally represents the importance of the corresponding term in computing the goodness rating for a particular layout of virtual machines.

Each of the terms in the cost function is based on parameters measured or estimated by the VM layout selector 144. For a given layout of virtual machines, parameters corresponding to the various criteria being considered are measured or estimated. For example, parameters relating to resource utilization, cooling costs, power consumption, balancing, and so forth, for a given layout of virtual machines can be measured or estimated. Note that the parameters corresponding to the current layout (the layout that is currently being used) can be measured by the VM layout selector 144. However, when considering alternative layouts (which are trial layouts not yet implemented) to compare to the current layout, the parameters for the alternative layouts may have to be estimated (using an internal model provided with the VM layout selector 144), where the model can be generated based on historical information. The measured or estimated parameters are then translated to the terms of the cost function. Thus, for each given layout of virtual machines, the cost function outputs a goodness rating indicator.

Figure 3:
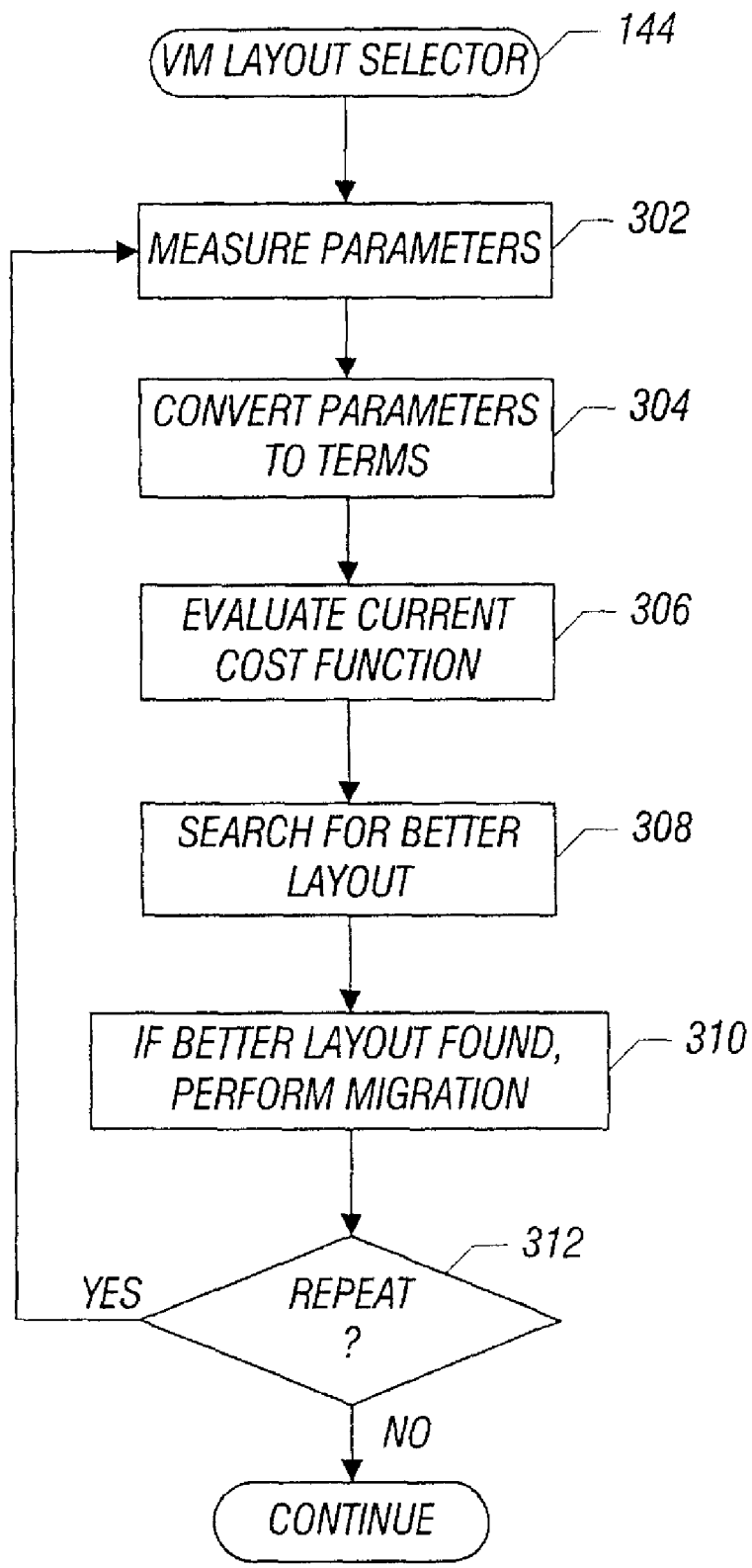
FIG. 3 is a flow diagram of a process of the placement controller selecting a layout of virtual machines, in accordance with an embodiment.

A flow diagram of a process performed by the VM layout selector 144 is depicted in FIG. 3. The flow of FIG. 3 is performed repeatedly, such as at regular intervals or in response to predefined events. The VM layout selector 144 of the controller 136 measures (at 302) various parameters relating to the terms to be considered for the cost function discussed above. The measured parameters are converted (at 304) into the terms for use in the cost function.

The VM layout selector 144 then evaluates (at 306) the cost function based on the terms derived from the measured parameters. The cost function produces an output that provides some indication of the performance of the particular placement of virtual machines on physical machines (such as in the form of a goodness rating or some other indicator). Next, the VM layout selector 144 searches (at 308) for a better layout that represents another placement of virtual machines on physical machines.

If a better virtual machine layout is found in the search (at 308) for the better layout, the VM layout selector 144 causes the migration module 146 to perform (at 310) migration of one or more virtual machines according to the better virtual machine layout. Migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually (e.g., lazily) to the destination physical machine to which the virtual machine is migrated.

The VM layout selector 144 determines (at 312) if the process at 304-310 is to be repeated. Repetition of the process at 304-310 can be performed periodically or in response to predefined events (e.g., detection of overheating, alarm indicating some fault has occurred, and indication of overloading, etc.).

Instructions of software described above (including the validation module 145, VM layout selector 144, and migration control module 146 of FIG. 1) are loaded for execution on a processor (such as one or more CPUs 138 in FIG. 1). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by at least one processor in a placement controller for validating manual virtual machine migration, comprising:
    receiving, by a placement controller, a user request to manually migrate at least one virtual machine across physical machines;
    determining, based on criteria used by the placement controller for automatically selecting placement of virtual machines on the physical machines, whether the user-requested migration of the at least one virtual machine violates the criteria; and
    in response to determining that the user-requested migration violates the criteria, providing a notification of the violation.

2. The method of claim 1, further comprising:
    detecting changing conditions in the physical machines; and
    in response to detecting the changing conditions, selecting a new layout of virtual machines on the physical machines that is different from an existing layout of virtual machines on the physical machines.

3. The method of claim 1, further comprising:
    providing an explanation regarding reasons for the violation.

4. The method of claim 3, wherein providing the explanation comprises identifying one or more criteria that the user-requested migration violates.

5. The method of claim 1, further comprising receiving information to modify the criteria that is responsive to the notification.

6. The method of claim 5, wherein receiving the information to modify the criteria comprises receiving the information from a user station.

7. The method of claim 5, wherein receiving the information to modify the criteria comprises receiving the information to perform at least one action selected from among: (1) adding one or more new criteria, (2) changing one or more existing criteria, and (3) deleting one or more existing criteria.

8. The method of claim 5, further comprising:
selecting a new proposed layout of virtual machines on the physical machines according to the modified criteria; and
presenting the new proposed layout to a user station to allow a user to confirm whether the new proposed layout coincides with the user's goal.

9. The method of claim 1, further comprising:
determining, by the placement controller, modified criteria in response to the determining the violation; and
communicating, by the placement controller, the modified criteria to a user station.

10. The method of claim 9, further comprising receiving user confirmation that the modified criteria is to be used by the placement controller in selecting layouts of virtual machines on the physical machines.

11. The method of claim 1, wherein receiving the user request comprises the user request that specifies that the at least one virtual machine is to be migrated from a first of the physical machines to a second of the physical machines, and where in the user-requested migration is specified by the user request.

12. A computer comprising:
a processor;
a display device to display a user interface; and
software executable on the processor to:
receive a request through the user interface regarding user-requested placement of virtual machines on physical machines;
in response to the request, send information to a virtual machine placement controller regarding the user-requested placement of virtual machines; and
receive, from the virtual machine placement controller, notification of whether the user-requested placement of virtual machines violates criteria used by the virtual machine placement controller to select layouts of virtual machines on physical machines.

13. The computer of claim 12, wherein the software is further executable to present, in the user interface, a first dialog to allow a user to abort the user-requested placement of virtual machines based on the notification.

14. The computer of claim 13, further comprising presenting, in the user interface, a second dialog to allow user modification of the criteria in response to the notification.

15. The computer of claim 12, wherein the user-requested placement is according to a user request that specifies at least one of the virtual machines is to be migrated from a first of the physical machines to a second of the physical machines.

16. An article comprising at least one computer-readable storage medium containing instructions that when executed cause a placement controller to:
detect, by a placement controller, a manual migration of at least one virtual machine across physical machines;
determine, based on criteria used by the placement controller for automatically selecting placement of virtual machines on the physical machines, whether the manual migration of the at least one virtual machine violates the criteria; and
in response to determining that the manual migration violates the criteria, provide a notification of the violation.

17. The article of claim 16, wherein the instructions when executed cause the placement controller to further:
send, to a user station, an explanation identifying one or more criteria that the manual migration violates.

18. The article of claim 17, wherein the instructions when execute cause the placement controller to further:
receive information to modify the criteria that is responsive to the notification.

19. The article of claim 16, wherein the instructions when executed cause the placement controller to further:
provide a prompt to a user regarding whether to change the criteria or to revert the system to an original configuration.

20. The article of claim 16, wherein the instructions when executed cause the placement controller to further:
receive an indication from a user that the migration is to proceed despite the violation of the criteria.

21. The article of claim 16, wherein the manual migration is based on a user request that specifies that at least one virtual machine is to be migrated from a first of the physical machines to a second of the physical machines.

* * * * *